Jan. 20, 1948. H. M. BRAMBERRY 2,434,880
CYLINDER SURFACE CHARACTER
Filed Sept. 22, 1944 5 Sheets-Sheet 1

Inventor:
Harry M. Bramberry
By Edward C. Fitzhugh
Atty.

Jan. 20, 1948. H. M. BRAMBERRY 2,434,880
CYLINDER SURFACE CHARACTER
Filed Sept. 22, 1944 5 Sheets—Sheet 2

Inventor:
Harry M. Bramberry
By Edward C. Fitzhugh
Atty.

Jan. 20, 1948.  H. M. BRAMBERRY  2,434,880
CYLINDER SURFACE CHARACTER
Filed Sept. 22, 1944  5 Sheets-Sheet 3

Inventor:
Harry M. Bramberry

Jan. 20, 1948.  H. M. BRAMBERRY  2,434,880
CYLINDER SURFACE CHARACTER
Filed Sept. 22, 1944  5 Sheets-Sheet 4

Inventor:
Harry M. Bramberry
By Edward C. Fitzbaugh
Atty.

Inventor:
Harry M. Bramberry

Patented Jan. 20, 1948

2,434,880

UNITED STATES PATENT OFFICE 2,434,880

CYLINDER SURFACE CHARACTER

Harry M. Bramberry, New Castle, Ind.

Application September 22, 1944, Serial No. 555,379

8 Claims. (Cl. 309—2)

This invention relates to improvements in the interior piston and ring engaging surface of internal combustion and other compression engine cylinders as well as to improved methods and arrangements for accomplishing the same.

It has now been established by my experience that the cylinder is the dominant controlling element of the three essential component parts of an engine, including the cylinder, piston and piston rings. This is believed to be fairly well evidenced by reference, for example, to an engine having a five inch (5") stroke and equipped with piston rings of one-eighth inch (1/8") width. The ratio of ring width to that portion of the cylinder length over which the rings must travel is 1:40. The piston ring represents only one-fortieth (1/40) of the area of the cylinder surface traversed by it during operation. The cylinder surface, therefore, is the major factor in the problem of satisfactory engine operation, because the cylinder works on the rings many times faster than the rings work on the cylinder.

Many proposals have been advanced respecting the problem of effecting the proper cooperation between these elements of the engine, including many kinds of surface coatings, but none to applicant's knowledge have overcome the inherent difficulty present.

As the high compression and high output of internal combustion engines has been further and further increased, such, for example, as in miliary aircraft engines, the problem of accomplishing the proper compatibility between the rings and embracing cylinder walls has become an increasingly serious one. High engine output probably produces the most detrimental effect upon piston rings and cylinder surfaces, due to the resultant extreme heat and loads to which these parts are subjected. This condition is particularly critical during the so-called "green" or run-in period. A still further aggravating factor is encountered where an effort is made to employ rings of material other than the commonly known cast iron material including, for example, Nitralloy steel rings. Attempts to operate Nitralloy steel rings on currently available cylinder walls results in microscopic-like cylinder surface disturbances with resultant loss of oil control due to the lack of compatibility of the engaging surfaces.

Therefore, one of the objects of the present invention is to incorporate the requisite factor of safety in the internal cylinder wall surface that will insure satisfactory compatibility of the piston, piston rings and cylinder wall surfaces necessary in order to realize minimum oil consumption and prolonged life of the engine parts.

I am aware that it has been proposed broadly heretofore to relieve bearing surfaces generally. This is based on the established premise that the load carrying capacity per unit of area is inversely proportional to the bearing contact area within limits. Especially is this evident within the compression ring travel of the cylinder surface.

It is a principal object of this invention to provide an improved arrangement taking advantage, among other things, of this fundamental principle in a novel manner accomplishing new and unexected improved results. My invention goes far beyond this earlier academically appreciated theory in that I have determined that the proper solution to the present problem involves the choice of a minimum depth of relieved area and a proportion of recessed or relieved area to raised plateau areas and that the said plateau areas must be substantially uniformly disposed, especially throughout the compression ring travel surface. I have found that accomplishment and maintenance of the proper surface for the rings and piston to glide over is determined by the optimum choice of these proportions.

It is a further object of this invention to provide and disclose what is believed to be the most effective and satisfactory manner of producing the above desirable proportion of relief to plateau areas.

It is a still further object to provide the optimum form, contour and character of inner cylinder surface for cooperating with the rings and piston under high temperature and high pressure conditions in a manner that results in the formation and maintenance of a lacquer-like coating throughout the ring travel, which coating together with the lubricant present will provide the necessary anti-friction conditions for prolonged operation.

A further and most important object is the provision of a cylinder having an internal surface character and pattern so arranged as to facilitate the removal of heat from the ring engaging surface and effective to prevent the localizing of heat at or on the absolute surface proper, that is, the portion of the cylinder which is in contact with the rings, which might otherwise cause fatal hot spots to occur, particularly on the downstream side of an air-cooled cylinder.

Other more particular objects, advantages, and uses of my invention will become apparent from a reading of the following specification taken in connection with the accompanying drawings which form a part thereof and wherein.

Figure 1:
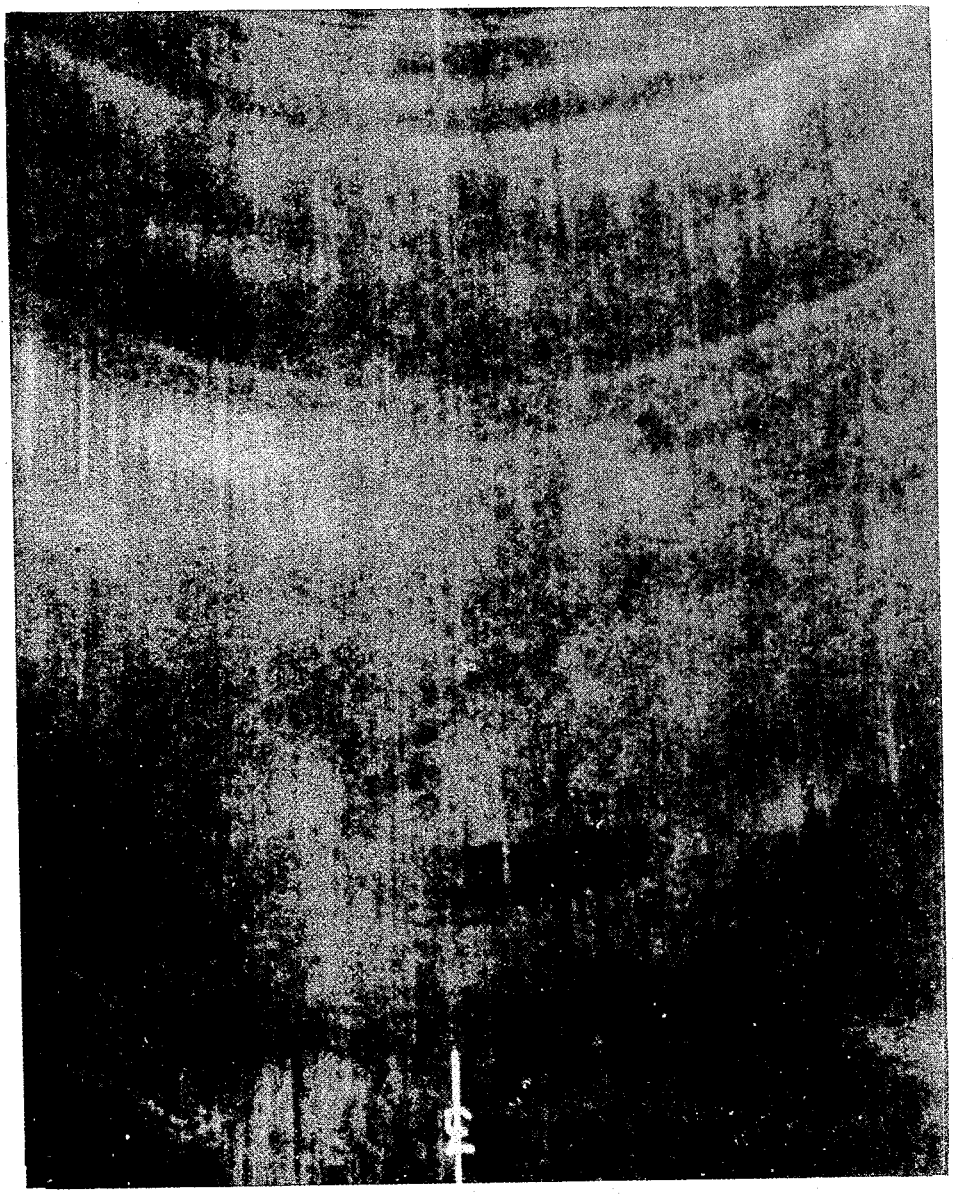
Fig. 1 is an actual photograph of approximately one-half of the interior surface of a standard production cylinder, not employing my invention, said surface showing the major thrust side thereof and indicating the condition of the surface after the green and final runs.
Figure 2:
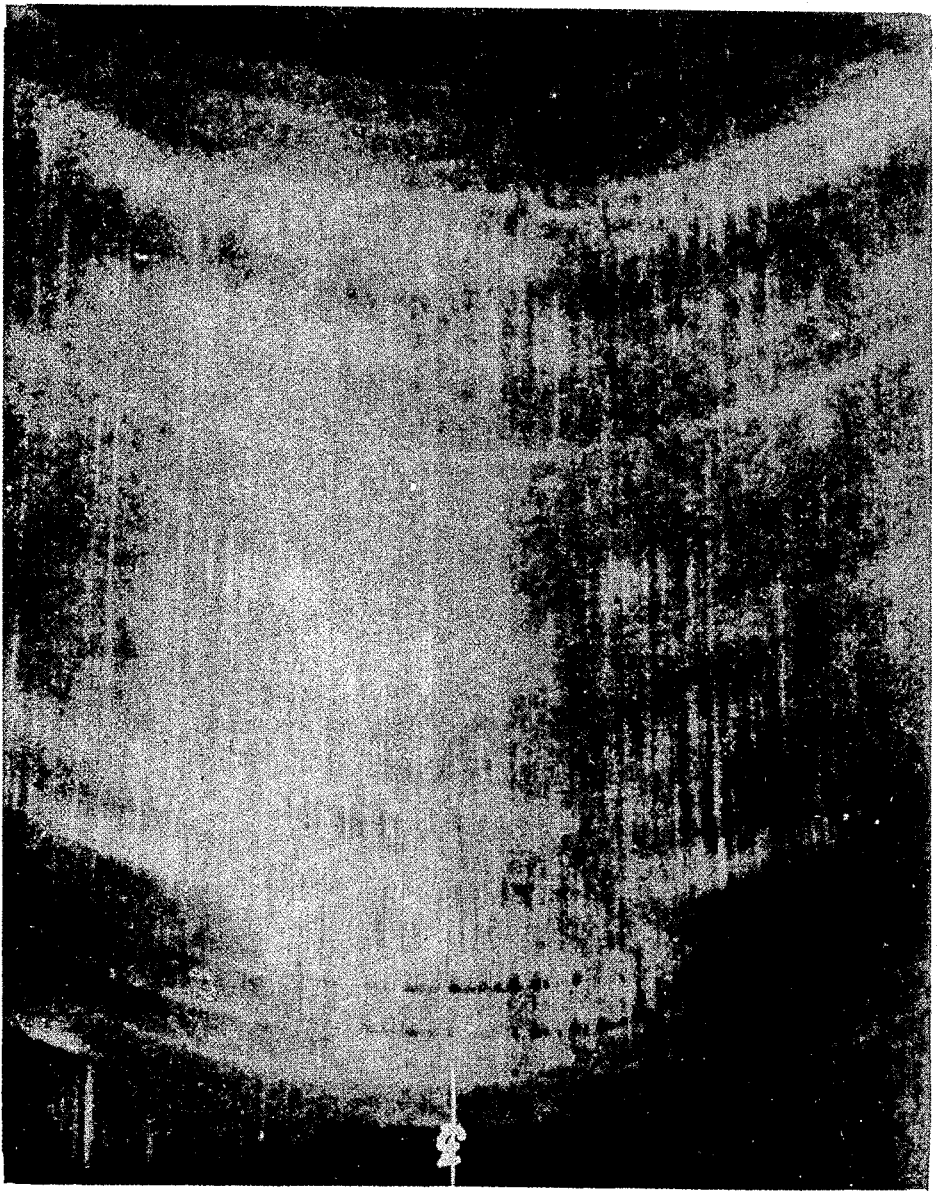
Fig. 2 is an actual photograph of a similar portion of the interior surface of the same standard production cylinder on the minor thrust side thereof after the green and final runs.

Referring in greater detail to the several figures of the drawing, it is believed that an understanding of the invention can be most readily facilitated by a comparison of an actual photograph of a cylinder surface treated in accordance with a preferred embodiment of my invention with photographs of cylinders finished in accordance with commonly practiced methods. Turning first to Figs. 1 and 2, actual photographs are shown of the major thrust and minor thrust sides of a standard production steel cylinder following the green and final runs. For comparison, in Fig. 3 there is shown an actual photograph of the major thrust side of a similar cylinder but surface-characterized and patterned in accordance with the preferred embodiment of my invention, following the green and final runs under substantially the same conditions as those to which the cylinder of Figs. 1 and 2 were operated. The remarkably improved results will be readily apparent from an inspection of those photographs.

The cylinder of Fig. 1 was finished by means of a conventional honing operation leaving the same with the usual surface roughness of the order of 10 R. M. S. This is substantially a mirror-like surface finish notwithstanding the fact that the cross-hatched pattern formed by the fine grit abrasive is still clearly discernible in Figs. 1 and 2 even after the green and final runs. It is readily apparent from an examination of Figs. 1 and 2 that these cylinders are now fatally defective and further operation would result in high oil consumption. Such cylinders would be unsuitable for high output and long service operation due to the surface disturbance or cold-worked condition shown thereon. This surface disturbance is evidenced on the photograph in the form of vertically extending white streaks as well as by horizontally extending disturbed bands at various levels, both indicating serious and fatal surface conditions imparted by the piston and rings. Such disturbance on the surface is accompanied by excessive blow-by, high oil consumption, and short life.

Figure 3:
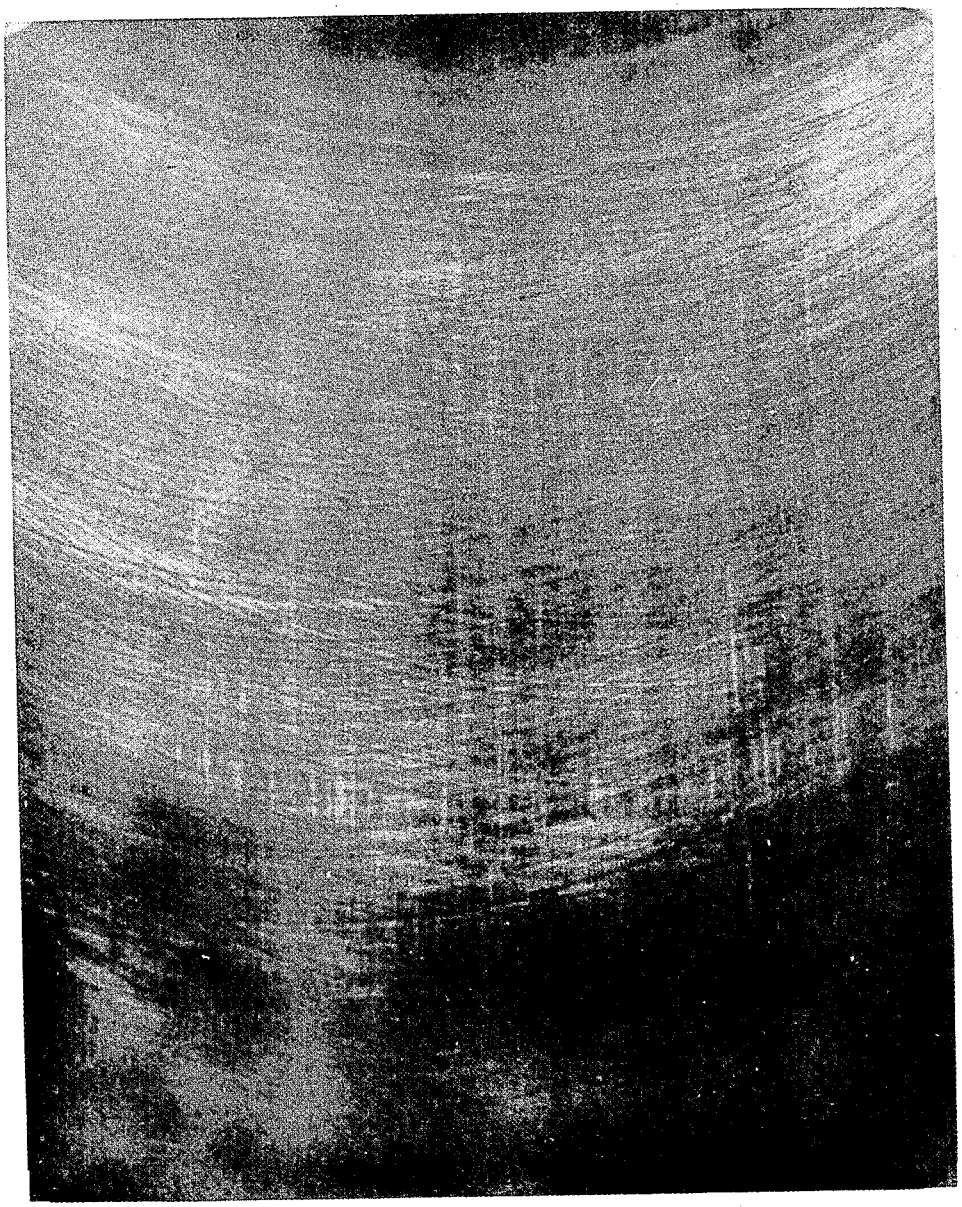
Fig. 3 is an actual photograph of approximately one-half of the internal surface of a cylinder formed with my novel scratched, cross-hatched pattern in relief, with a super-imposed plateau surface, said photograph showing the major thrust side thereof and having been taken after the cylinder had operated under severe conditions in a high output internal combustion engine.
Figure 4:
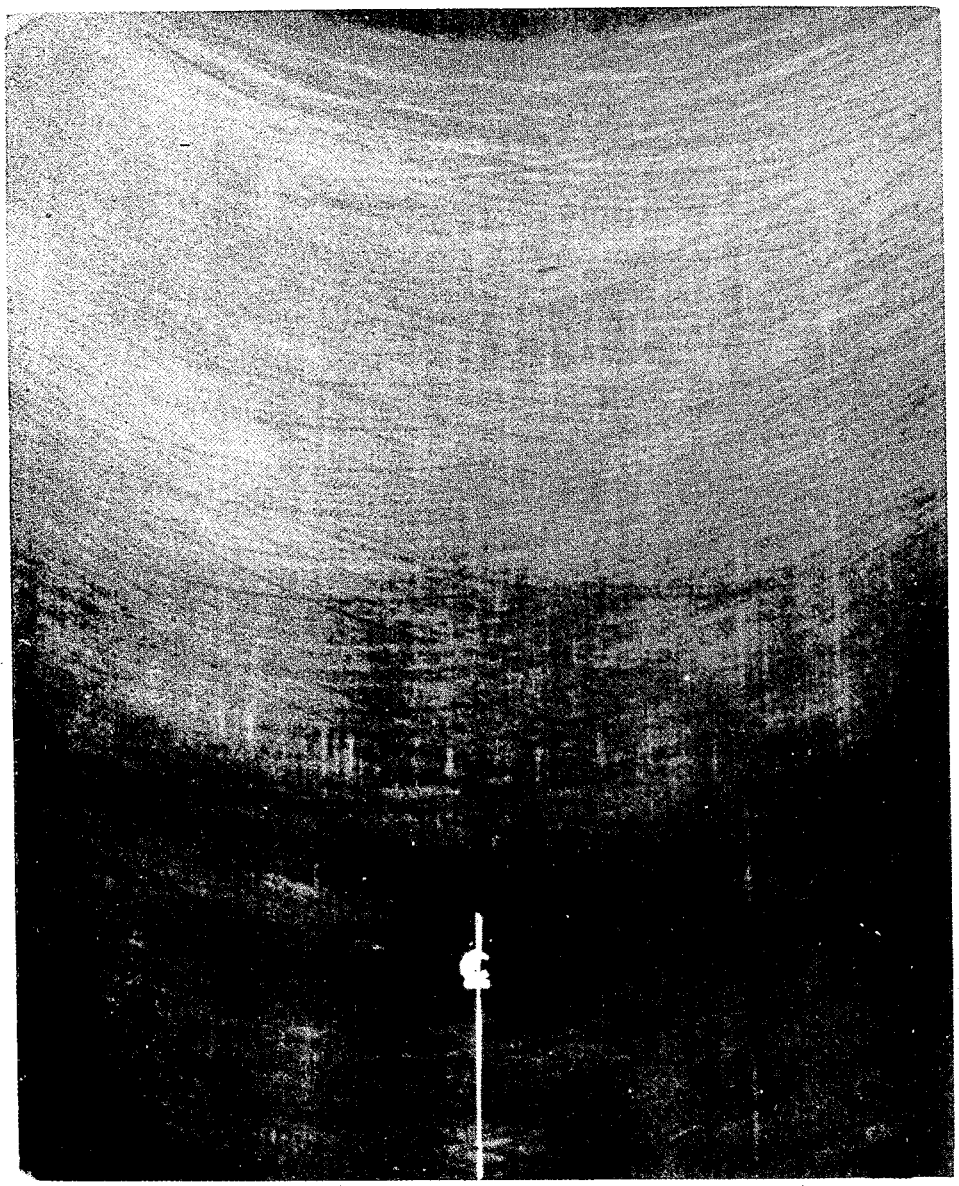
Fig. 4 is an actual photograph of the cylinder of Fig. 3, but showing the minor thrust side thereof.

The comparison of the structure of Figs. 1 and 2 with my improved construction of Figs. 3 and 4 is outstanding. The photographs of Figs. 3 and 4 show ideal compatibility and an ideal bearing surface. The scratched, cross-hatched relief pattern with intervening piston and ring supporting plateau surfaces shows absence of surface disturbance. There is no significant evidence of piston ring or piston skirt cross-head actions or markings on this surface such as shown in Figs. 1 and 2.

It is also pointed out that the piston as well as the rings removed from the cylinder shown in Figs. 3 and 4 showed even more remarkable results, further substantiating the importance of my improved cylinder surface character or pattern in relief. For example, while similar types of rings and pistons were used in both tests, the rings from the cylinder of Figs. 1 and 2 were badly scratched and worn. On the contrary, the rings from Figs. 3 and 4 were not worn and showed no evidence of scratching. In fact, the tool marks were still visible from the rings of Figs. 3 and 4. Such marks were entirely obliterated by wear in the case of the rings from Figs. 1 and 2.

All of the photographs reproduced in Figs. 1 through 5 were taken by an expert photographer and comprise an enlargement of approximately two to one of the normal size of the actual area photographed.

Figure 5:
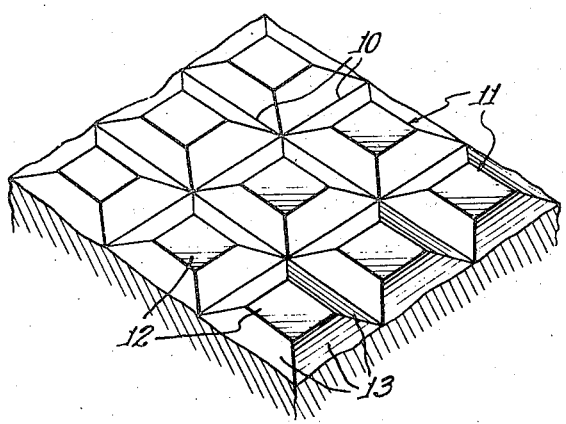
Fig. 5 is a perspective-like view showing a section of the scratched, cross-hatched surface and the plane plateau surface schematically for the purpose of ready reference and description of the component structural parts.
Figure 6:
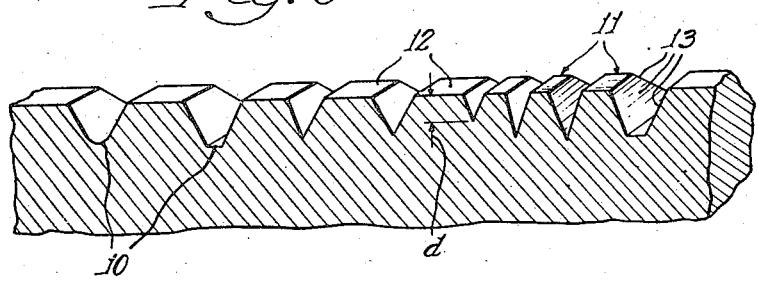
Fig. 6 is an enlarged or magnified cross-sectional view of a relief pattern formed by my honing process.

Turning now in particular to Figs. 5 and 6, there is shown schematically and enlarged the structure of Fig. 3, these enlarged showings being employed to facilitate a discussion of the details of the structure. In accordance with this preferred embodiment of my invention, I find that this improved surface structure or character can be most readily and effectively provided by employing a commercially available honing machine including a special honing tool assembly provided with bonded abrasive grit of the requisite size and uniformity necessary to scratch, cross-hatch the cylinder surface with my improved pattern and to the requisite depth of scratches or relief. The basic differences between the honing operation that I perform within the cylinder wall and that which has been previously known and practiced include: (1) the minimum depth of the relief or scratches; (2) the proportion of total relief to unrelieved ring contact area including the requisite substantially uniform pattern formed by the multiplicity of unrelieved area, and (3) the highly important results flowing from (1) and (2).

Looking at the unsatisfactory cylinders of Figs. 1 and 2, it will be seen that these cylinders contain cross-hatched relief marks of a microscopic character insufficient in depth to function in the manner herein contemplated. Turning to Figs. 3 through 6, this stratched, cross-hatched pattern has been given a depth as great or greater than the low limit which I have found to be necessary in order to accomplish satisfactory results. Referring to Fig. 5, I have found that unless the scratches 10 are given a depth $d$ of at least .0002", satisfactory operation will not be obtained. This depth may, of course, vary within practical limits from .0002" to a greater value. However, if there are any areas within the ring travel of the cylinder wall wherein the scratches or relief extend to a depth less than .0002", this portion of the cylinder will, it has been found, be subject to surface disturbance or what is generally known as scuffing, scoring, and consequent failure. It will be noted that in imparting the cross-hatch pattern to the cylinder, the relief marks defining the plateau areas are angularly related to each other and that each mark is in effect, a spiral scratch, extending from one end of the cylinder to the other.

As a further improved aspect of my invention, I prefer to provide the protuberances disposed between successive deep scratches with a superimposed finish or plateau area for the rings to glide upon. This results in a multiplicity of radially inwardly extending frusto-pyramidal protuberances 11 terminating in generally diamond-shaped ring engaging plateau areas 12, these protuberances being bounded on the sides thereof with converging surfaces 13. Cross-sections taken generally through protuberances 11 parallel to plateau areas 12 have increasing areas proceeding from plateau area 12 to the base of the respective protuberances. The finishing of plateau areas 12 is preferably accomplished by employing a relatively fine hone having a grit of the order of six hundred (600) following the initial rough scratching by means of the coarser grit hone with the result that an amount of stock of the order of .0001" to .0003" is removed from the initial protuberance. Substantially smooth plateau areas 12 remain together with intervening scratches or grooves 10 having a minimum depth of not less than .0002". These protuberances 11 and plateau areas 12 are substantially uniformly distributed throughout the ring travel. Especially is this distribution of scratches and plateau areas necessary within the power zone or compression ring travel of the cylinder. The foregoing pattern is to be clearly distinguished from indiscriminate roughing or scratching of cylinder walls for purposes other than the purposes herein contemplated and with no view to uniformity or symmetry of pattern or of scratches of the depth herein disclosed. In the magnified view of Fig. 6 it will be noted that certain of the scratches are shown with rounded bottoms, others with substantially flat bottoms, while others have acute-angled bottoms. Moreover certain of the plateaus 12 are of different width than others. This is merely due to the wearing away of the stones during my honing operation, and in this figure an attempt has been made, as above set forth, to show the resultant relief pattern as it was actually made by the honing process heretofore referred to. In any event, it will be observed that the pattern in relief, which is secured, is substantially uniform and presents a multiplicity of isolated plateau areas, bounded by angularly related scratches or grooves.

It is of further importance to note that the total area of plateaus 12 bears an important relationship to the total intervening or relieved area. I have found that unless the relieved area is at least fifteen to twenty per cent of the total area at the plateau level satisfactory results cannot be obtained. This ratio may vary from fifteen to sixty per cent relief with corresponding percentage of plateau area, and I have found that for steel cylinders used in high compression military aircraft engines a relief of about thirty to forty per cent is most effective.

I have found that the above construction of cylinder interior surface shows greatly improved heat removing characteristics. The multiplicity of frusto-pyramidal protuberances having converging sides and increasing cross-sectional area from the plateaus 12 to the base thereof appear to greatly influence and improve the heat transfer from the absolute surface of the plateau areas. This increasing cross-sectional area of the protuberances 11 would appear to create a sizeable potential of heat flow to the base metal of the cylinder in conformity with the established formula for heat transfer:

$$Q = \frac{kA\Delta t}{L}$$

wherein

Q = B. t. u. transmitted per minute
k = conductivity, B. t. u. per minute per sq. inch per degree F. per inch of thickness
A = area in square inches
$\Delta t$ = temperature difference °F.
L = length of path of heat transfer in inches.

Attention is directed to the fact that the oil consumption particularly at the beginning of operation will be influenced by the depth of the scratches unless special provision is made to prevent the same. The life of a cylinder treated in accordance with the present invention will likewise be determined by the depth of these scratches, since if the protuberances are worn down to a level where the depth of the surrounding scratches is reduced below the low limit of .0002", failure may result upon installation of a new set of rings. The Johanson block effect can cause failure in lubrication too, if such be the case even with the original ring equipment if the cylinder surface becomes smooth by wearing away the pattern, due to insufficient depth of relief scratches. Therefore, it is preferable to provide the initial depth of the scratches of a value in excess of .0002". However, if the scratches exceed the order of .001" depth, it will be found that initial oil consumption may be high. Within these limits, depending upon the type of service of the cylinder, I have found that oil consumption is low, even during the green or run-in period, when the lacquer coating, referred to more in detail hereinafter, is accumulating on the plateau surfaces and within the scratches.

Engines fitted with cylinders incorporating the above improved surface structure will permit maximum power to be taken therefrom in a minimum period of run-in time. Under the most severe run-in condition the usual tendency to damage, scuff, or score the compression ring and cylinder surfaces is eliminated. Low oil consumption and minimum blow-by are realized. Engines with such ring and cylinder surface compatibility as herein disclosed will give long and continued service between overhaul periods.

Still another very important aspect of my invention is the fact that by employing the above specified proportions of relief to plateau area and minimum depth of relief, as well as uniformity of plateau area disposition, there results what is considered substantially perfect compatibility and lubricating conditions under the most severe operating requirements; namely, there occurs a substantially uniform lacquer coating throughout the ring travel. I have found that the lacquer coating, which occurs in cylinders treated in conformity with my invention and which coating is maintained therein during operation, affords an ideal anti-friction surface on which the rings glide. It is also interesting to note that where a range of relief recess depth or scratch depth is employed of the order of .0002" to .005", it has been found that the wear surfaces are perfectly compatible and the aforesaid lacquer formation will occur and be maintained, thus providing, together with the lubricant, a substantially frictionless coating for the rings and piston to glide upon. The formation or accumulation of this lacquer coating is full and complete evidence that lubrication of the wear surfaces is fully effected, which results in complete compatibility of the cooperating wear surfaces.

While I have disclosed my invention as particularly contemplating relieving the cylinders by scratch-hatch honing for the important reasons above pointed out, I nevertheless also contemplate that the same or equivalent proportions of relief to plateau area as well as minimum depth requirements may be accomplished by other techniques within the broadest aspect of my invention, and the disclosure herein contained should in all the broader aspects thereof be considered as by way of example, and the scope of my invention should be determined by the appended claims.

I claim:

1. An engine cylinder having an internal ring travel surface comprising substantially symmetrical plateau surfaces substantially uniformly distributed throughout said ring travel surface and functioning to provide a gliding surface for piston and rings, each of said plateau surfaces forming the terminal portion of a four-sided frusto-pyramidal protuberance having an increasing cross-sectional area proceeding from said plateau area to the base thereof whereby to cause the heat flow from the plateau areas to follow the formula:

$$Q = \frac{kA\Delta t}{L}$$

wherein

Q = B. t. u. transmitted per minute
k = conductivity, B. t. u. per minute per sq. inch per degree F. per inch of thickness.
A = area in square inches
$\Delta t$ = temperature difference °F.
L = length of path of heat transfer in inches so as to take advantage of the increasing capacity of heat transfer with the increasing distance from the plateau surface area toward the base of said frusto-pyramidal protuberance.

2. An engine cylinder having an internal ring travel surface 15 to 60 per cent of the area of which is cut away to a depth of at least .0002 inch leaving a plurality of radially inwardly extending protuberances distributed substantially uniformly over the ring travel area.

3. An engine cylinder having an internal ring travel surface formed into a pattern in relief by radially inwardly extending protuberances separated by substantially continuous scratches of at least .0002 inch in depth, each of said protuberances having a plateau surface on the radially inward extremity thereof which forms part of the ring travel surface of the cylinder.

4. An engine cylinder having an internal ring travel surface formed into a pattern in relief by radially inwardly extending protuberances separated by substantially continuous scratches of at least .0002 inch in depth, each of said protuberances having a plateau surface on the radially inward extremity thereof which forms part of the ring travel surface of the cylinder and all of said plateau surfaces constituting from 40 to 85 per cent of the part of the ring travel surface which is formed in a pattern in relief.

5. An engine cylinder having an internal ring travel surface formed into a pattern in relief by cross-hatched grooves of at least .0002 inch in depth defining a plurality of radially inwardly extending protuberances of each having a plateau surface on the radially inward extremity thereof which forms part of the ring travel surface of the cylinder, the relieved area formed by said grooves constituting at least 15 per cent of the part of the ring travel surface which is formed into a pattern in relief.

6. An engine cylinder having an internal ring travel surface formed into a pattern in relief by cross-hatched grooves of at least .0002 inch in depth defining a plurality of radially inwardly extending frusto-pyramidal protuberances each having a plateau surface on the radially inward extremity thereof which forms part of the ring travel surface of the cylinder, the relieved area formed by said grooves constituting at least 15 per cent of the part of the ring travel surface which is formed into a pattern in relief.

7. An engine cylinder having an internal ring travel surface formed into a pattern in relief by cross-hatched grooves of at least .0002 inch in depth defining a plurality of radially inwardly extending frusto-pyramidal protuberances each having a plateau surface of polygonal shape on the radially inward extremity thereof which forms part of the ring travel surface of the cylinder, the relieved area formed by said grooves constituting at least 15 per cent of the part of the ring travel surface which is formed into a pattern in relief.

8. An engine cylinder having an internal ring travel surface formed into a pattern in relief by cross-hatched grooves of at least .0002 inch in depth defining a plurality of radially inwardly extending frusto-pyramidal protuberances each being of decreasing cross-sectional area from the base radially inwardly and each having a plateau surface of polygonal shape on the radially inward extremity thereof which forms part of the ring travel surface of the cylinder, the relieved area formed by said grooves constituting at least 15 per cent of the part of the ring travel surface which is formed into a pattern in relief.

HARRY M. BRAMBERRY.

REFERENCES CITED

The following references are of record in the file of this patent:

UNITED STATES PATENTS

| Number | Name | Date |
|---|---|---|
| 1,682,130 | Johnston | Aug. 28, 1928 |
| 2,108,029 | Connor | Feb. 8, 1938 |
| 2,200,573 | Connor | May 14, 1940 |
| 2,229,318 | Wallace | Jan. 21, 1941 |

OTHER REFERENCES

"Grinding Wheels and Their Uses" by Johnson Heywood, published by The Penton Publishing Co., Cleveland, Ohio, 1924, pages 295–301, inclusive. (Copy in Div. 58.)